Dec. 4, 1956 P. R. R. AIGRAIN ET AL 2,773,250
DEVICE FOR STORING INFORMATION
Original Filed April 28, 1954
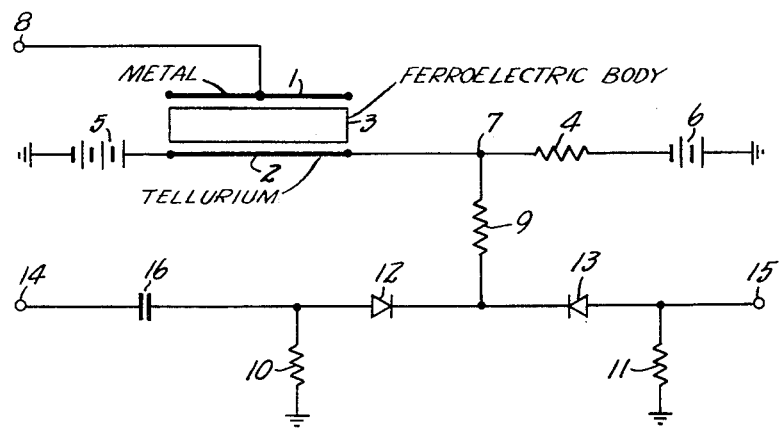
INVENTOR.
P. R. R. AIGRAIN
G. B. A. LIANDRAT
BY
ATTORNEY United States Patent Office 2,773,250
Patented Dec. 4, 1956

2,773,250

DEVICE FOR STORING INFORMATION

Pierre Raoul Roger Aigrain and Georges Benoit Antoine Liandrat, Paris, France, assignors to International Standard Electric Corporation, New York, N. Y., a corporation of New York Continuation of abandoned application Serial No. 426,173, April 28, 1954. This application May 5, 1955, Serial No. 526,927

Claims priority, application France May 13, 1953
(Filed under Rule 47(b) and 35 U. S. C. 118)

17 Claims. (Cl. 340—173)

The present invention relates to improvements in or relating to devices for storing or recording information and more particularly to such devices intended for registering information in the form of electric characteristics. This application is a continuation of our application Serial No. 426,173, filed April 28, 1954, and now abandoned.

Amplifier elements are known in which use is made of semi-conductors, such as the devices known under the name of "Transistors" which have been described in particular by J. Bardeen and by W. Shockley in "Electrons and Holes in Semi-Conductors," D. Van Nostrand, New York, N. Y. 1950, and the devices using the modulation of the resistance of a thin semi-conducting layer by an electric field applied perpendicularly to its surface. The phenomenon used in the second above mentioned device has been studied by using germanium as a semiconductor which does not lend itself to practical applications in this particular case. It has been noted that tellurium containing impurities of the p type (conduction through positive holes) constituted a suitable material easy to evaporate in thin layers.

Circuit elements have already been described comprising a condenser one electrode of which is constituted by a thin layer of tellurium. In these devices the dielectric material used for constituting the condenser must be able to withstand a high electric field without disruption and therefore must have a high dielectric constant. On the other hand it is of interest in such applications that the dielectric material be such as to permit the attainment of thin layers, so that the necessary electric field may be obtained by applying a relatively moderate voltage on the electrode opposite to the tellurium. Mica or a thin layer of varnish, such as shellac, fulfils these conditions. On the other hand necessary precautions must be taken in order that the electrodes do not give rise to a rectifying effect at the contact of the tellurium. For example, use may be made of graphite electrodes, in particular Aquadag.

The tellurium used is generally available in very pure form and one must add to it impurities of the p type, for instance antimony. It will be noted in particular that the resistance of the tellurium layer increases when a positive voltage is applied on the opposite electrode, and this resistance diminishes when a negative voltage is applied. However the amplifying device thus obtained operates properly only at very low frequencies owing to the important input capacity.

One of the objects of the present invention is to provide a device for storing of simple information using the phenomena described above.

According to one of the features of the present invention, a device for storing information comprises in combination a condenser having a first metallic electrode, a second electrode constituted by a thin layer of a semi-conductor containing impurities of the p type, a layer of a ferro-electric dielectric body disposed between the two said electrodes, means for applying electric potentials to the said first electrode and means for detecting the potential variations of the semi-conductor layer which take place in response to potentials applied to the said first electrode.

According to another feature of the present invention in such devices, use is made of tellurium as a semiconductor body for constituting the second electrode containing impurities of the p type, such as antimony.

According to another feature of the invention, in such devices, use is made of a dielectric body of barium titanate or of a ceramic incorporating strontium and barium titanate.

Other objects, features and advantages of the present invention will appear from the reading of the following description of an embodiment, the said description being made in conjunction with the accompanying drawings representing a circuit for storing electric impulses embodying features of the invention.

There has been shown in the figure a condenser having a metallic electrode 1, the other electrode being constituted by a thin layer of tellurium 2. The dielectric 3 is a ferro-electric body, such as barium titanate or a ceramic incorporating strontium and barium titanates, which has a very high dielectric constant of the order of 3,000. The tellurium layer 2 is connected in series with a load resistance 4 between two grounded batteries 5 and 6, respectively positive and negative with equal voltage values. These elements must be provided in order that point 7 be normally at ground potential when no potential is applied to electrode 1. If an important voltage is applied through terminal 8 to the electrode 1, which fulfils the function of the control electrode, the resistance of the tellurium layer 2 varies, as has been indicated, and further, this control effect persists when the control potential is no longer applied to the electrode 1. It will be noted that the modification of the resistance of tellurium layer 2, which continues after the application of the control potential, is almost equal to the maximum variation of the resistance due to the dielectric ferroelectric saturation.

The circuit which has just been described may be used as a device for storing information. For this purpose, the potential of point 7 is used for controlling an electronic gate constituted by resistances 9, 10 and 11 and the elements 12 and 13 with asymmetric conductivity which may be germanium diodes. This electronic gate is placed between an input terminal 14 and an output terminal 15. If a positive impulse is applied, for instance, to the controlling terminal 8, the resistance of the tellurium layer increases and the potential of point 7 diminishes. The rectifiers 12 and 13 then have a low impedance to the passage of signals, such as impulses or alternative current signals, which are applied by an electronic gate through a condenser 16 from terminal 14 and which appear at the output terminal 15. A reverse polarity impulse, applied at the control terminal 8, causes the return to the initial state, the tellurium layer 2 having again a low resistance, so that point 7 returns to the ground potential, thus closing the electronic gate. Such elements therefore permit the recording of the presence or the absence of electric impulses at the controlling terminal 8, and may be associated in order to register groups of impulses corresponding to complex information.

While the principles of the invention have been described above in connection with specific embodiments and particular modifications thereof, it is to be clearly understood that this description is made only by way of example and not as a limitation on the scope of the invention.

What is claimed is:

1. An information storing device characterized in this that said device comprises a condenser having a first electrode of metal, a second electrode of a thin layer of a semi-conductor containing impurities of the p type, and a dielectric body of a ferro-electric material between said electrodes, means for applying electric potentials to said first electrode, and means for detecting variations in the electrical characteristics of said second electrode which take place in response to potentials applied to said first electrode.

2. An information storing device, as defined in claim 1, in which the second electrode is made of tellurium containing antimony as an impurity.

3. An information storing device, as defined in claim 2, in which the dielectric body comprises barium titanate.

4. An information storing device, as defined in claim 3, in which the means for detecting variations in the electric characteristics of the second electrode comprises a circuit in series with said second electrode, means for normally causing a current to flow through said circuit, and means connected to said circuit adapted to respond when the value of said current is altered in a predetermined manner.

5. An information storing device, as defined in claim 2, in which the dielectric body comprises a ceramic incorporating strontium and barium titanates.

6. An information storing device, as defined in claim 1, in which the ferro-electric material of the dielectric body has a dielectric characteristic of the order of 3,000.

7. An information storing device, as defined in claim 1, in which the dielectric body comprises barium titanate.

8. An information storing device, as defined in claim 1, in which the dielectric body comprises a ceramic incorporating strontium and barium titanates and having a dielectric characteristic of the order of 3,000.

9. An information storing device, as defined in claim 1, in which the means for detecting variations in the electric characteristics of the second electrode comprises a circuit in series with said second electrode, means for normally causing a current to flow through said circuit, and means connected to said circuit adapted to respond when the value of said current is altered in a predetermined manner.

10. An information storing device comprising a condenser having a pair of plates and a dielectric material between said plates having a high dielectric constant of the order of 3,000 or more, one of said plates being a thin sheet of a material the resistance of which will vary with a change of potential between said plates, and means for detecting variations in the resistance of said one plate.

11. An information storing device, as defined in claim 10, in which the plate the resistance of which varies is a semi-conductor containing impurities of the p type.

12. An information storing device, as defined in claim 11, in which the semi-conductor plate is made of tellurium containing antimony as an impurity.

13. An information storing device, as defined in claim 10, in which said dielectric material is a ferro-electric material.

14. An information storing device comprising a first electrode, a second electrode, and a body of ferro-electric material between said electrodes, one of said electrodes being of such material and configuration that the resistance thereof will vary with a change of potential between said electrodes.

15. An information storing device, as defined in claim 14, in which the electrode whose resistance varies with a change of potential between the electrodes is a semi-conductor containing impurities of the p type.

16. An information storing device, as defined in claim 15, in which the semi-conductor is tellurium containing antimony as an impurity.

17. An information storing device, as defined in claim 16, in which the ferro-electric material has a dielectric constant of the order of 3,000.

References Cited in the file of this patent

UNITED STATES PATENTS 2,524,033     Bardeen _____ Oct. 3, 1950

OTHER REFERENCES

"Electrons and Holes in Semi-Conductors," by Shockley (textbook), published November 1950; pages 29 and 30.

Proceedings of Western Computer Conference, June 1953, "The Snapping Dipoles of Ferroelectrics as a Memory Element for Digital Computers," by Pulvari, page 158.